United States Patent [19]
Lin

[11] 3,803,903
[45] Apr. 16, 1974

[54] APPARATUS AND METHOD FOR MEASURING THE RHEOLOGICAL PROPERTIES OF A FLUID

[75] Inventor: Otto C. C. Lin, Cherry Hill, N.J.

[73] Assignee: E. I. du Pont de Nemours and Company, Wilmington, Del.

[22] Filed: Mar. 23, 1972

[21] Appl. No.: 237,392

[52] U.S. Cl. ................................................. 73/59
[51] Int. Cl. ......................................... G01n 11/14
[58] Field of Search .................................. 73/59, 60

[56] References Cited
UNITED STATES PATENTS
2,679,157   5/1954   Carpenter ........................... 73/59
2,484,761   10/1949   Stock .................................... 73/59
2,796,758   6/1957   Myers et al. ......................... 73/60
2,977,790   4/1961   Dubsky et al. ....................... 73/60

OTHER PUBLICATIONS
Ferranti Portable Viscometer Publication; p. 1–12, reprinted Dec. 1964.

Primary Examiner—Jerry W. Myracle
Assistant Examiner—Joseph W. Roskos

[57] ABSTRACT

Disclosed herein is an apparatus of the coaxial cylinder type, and a method for rapidly and accurately measuring the rheological properties of a fluid, particularly the shear dependent viscosity, thixotropy and yield stress of a non-Newtonian fluid.

14 Claims, 3 Drawing Figures

APPARATUS AND METHOD FOR MEASURING THE RHEOLOGICAL PROPERTIES OF A FLUID

BACKGROUND OF THE INVENTION

1. Field of the Invention

This invention relates to an apparatus and method for measuring the rheological properties of a fluid, particularly a non-Newtonian fluid. More specifically, it relates to an apparatus of the coaxial cylinder type which is particularly useful as an instrument for measuring the shear dependent viscosity, thixotropy and yield stress of a non-Newtonian fluid.

2. Background of the Invention

Perhaps the simplest rheological property of a fluid is its viscosity. Instruments of the coaxial cylinder type are generally viscosimeters consisting of a cylindrical container for the fluid to be tested and a rotating cylinder immersed in the fluid. An examination of the torques exerted on the curved surface of the rotating cylinder leads to an equation for the flow between the coaxial cylinder, and hence to an equation for the viscosity which is a measure of the resistance to flow exhibited by the fluid. For Newtonian fluids, the viscosity is dependent only on the radii of the two cylinders, the rotational speed of the rotating cylinder and the torque exerted on the rotating cylinder. At a constant rotational speed, the viscosity of a fluid can, therefore, be measuerd by measuring, in one way or another, the drag exerted on the rotating cylinder by the fluid. A major source of error in such instruments, however, is the force exerted on the ends of the cylinder. Elaborate and time-consuming methods have been devised to compensate for the end effect (see for example Industrial Rheology by P. Sherman published by Academic Press in 1970, pp. 49).

For non-Newtonian fluids, there is another source of error introduced by virtue of the fact that the viscosity of non-Newtonian fluids is shear dependent. Since there is a velocity gradient across the gap between the two cylinders, the shear rate will vary across the gap so that any determination of the viscosity of the fluid in the gap will be an average determination.

Furthermore, non-Newtonian fluids exhibit a variety of other shear dependent rheological properties. Many of these properties are of interest to those attempting to characterize a material or to determine how the material will react under use conditions. For example, when subjected to a constant rate of shear, certain fluids exhibit a time dependent shear stress. This property is called thixotropy. Eventually, an equilibrium state is reached, but the initial stress and the process by which the equilibrium state is achieved are dependent upon the history of the fluid. The characterization of such a material will, therefore, depend to a great extent upon the information required. For example, if the information required relates to the consistency of a paint in a paint can, then the measurement should be made at a low shear rate to insure minimal structural alteration. If, however, the information required is the ease with which a paint spreads as it is applied, then the properties should be measured at a shear rate approximating use conditions which, in this instance, will depend on whether the paint is brushed, rolled, or sprayed on the surface to be coated. The same is true for many other fluids.

A versatile instrument to measure the rheological properties of fluids, particularly non-Newtonian fluids must be capable not only of accurate determinations but also of rapid determination under a variety of conditions. Present viscosimeters, particularly those of the coaxial cylinder variety, suffer from the disadvantage of being cumbersome, expensive and of limited versatility. They generally do not effectively compensate for the effects of the forces exerted on the ends of the cylinder nor do they provide for any simple and rapid way to vary the rotational speed of the rotating cylinder. Furthermore, they are designed so that the rotational member is fully immersed in the fluid, which complicates compensation for the end effects, and the means for measuring the drag exerted by the fluid on the rotating member are limited to a narrow operating range. Finally, no simple and accurate method of characterizing thixotropy has been established.

SUMMARY OF THE INVENTION

In the present invention, the disadvantages of the prior art instruments have been avoided by providing an apparatus for measuring the rheological properties of a fluid comprising:

a. a cylindrical container for the fluid;

b. a cylindrical member having a diameter slightly less than the inside diameter of the container, the member having a depression in at least one of its ends so that the side of said member forms a narrow annular ridge defining the depression;

c. means for supporting the member concentrically within said container, with the depression facing downward, so that the top of the member is level with the top of the fluid;

d. means for imparting relative rotational movement between the member and the container, the relative rotational movement preferably being at a constant speed;

e. means for continuously varying the speed at which the member and the container move relative to one another; and f. means for measuring that component of torque required to keep the member and the container moving relative to one another at the desired speed.

In the preferred embodiment, the cylindrical member has a depression or concavity in each of its ends and the cylindrical container is stationary so that the means for imparting relative rotational movement comprises the following: a variable speed dc motor attached to a shaft supporting the cylindrical member; a means for monitoring the rotational speed of the motor; and an electrical feedback loop for maintaining the rotational speed of the motor at a constant value. Furthermore, the means for measuring the torque required to keep the member rotating at a constant speed is a means to measure the current supplied to the motor.

The dimensions of the system are not critical, but to improve the accuracy of the instrument, the ratio of the radius of the container to the radius of the rotating member should be in the range of about 1.15 to about 1.65; much smaller than this, and the inaccuracies caused by an uncentered cylinder become too great; much larger than this, and the container used either becomes too large or the sensitivity becomes too low. A particularly useful instrument uses a member with a diameter of about 2 ⅝ inches and a standard pint can, having a diameter of 3 ⅝ inches, as the container.

An accurate and convenient measure of the thixotropy of a fluid can be determined by measuring the initial torque, or $f_i$, the corresponding stress required to start the member rotating at a constant speed and the equilibrium stress $f_e$ required to keep the member rotating at the constant speed, and, then taking the difference $(f_i-f_e)$ or the ratio $(f_i-f_e)/f_e$.

BRIEF DESCRIPTION OF THE DRAWINGS

The invention can best be understood by reference to the following drawings in which.

DESCRIPTION OF THE PREFERRED EMBODIMENT

Figure 1:
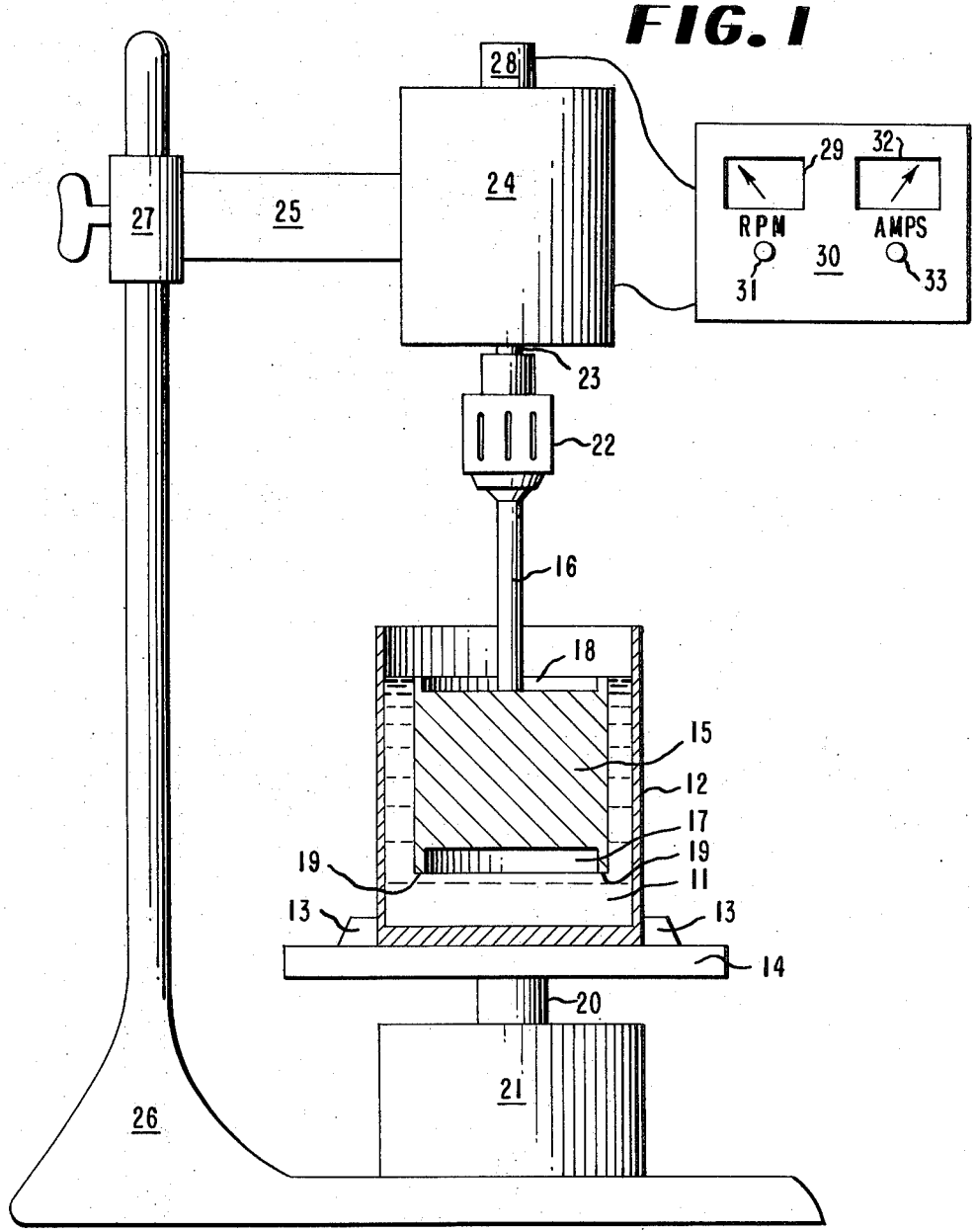
FIG. 1 is a schematic diagram of one embodiment of the present invention.

In FIG. 1, the liquid to be tested 11, is contained in cylindrical container 12 which is supported by clamps 13 on plate 14. A cylindrical member 15 having a diameter slightly less than the inside diameter of the container is inserted into the liquid so that the top of the cylinder is just level with the top of the liquid. Alternatively, the level of the liquid could be below the top of the member 15, but the member should never be fully immersed in the liquid. The member, which is supported by shaft 16, has a concavity 17 on its bottom surface and a concavity 18 on its top surface. Air is trapped in the bottom concavity so that the liquid 11 only contacts the bottom of the member on the narrow annular ridge 19. The shape of the bottom concavity is not particularly critical; its purpose being to reduce the force exerted on the end of the cylinder by the liquid. The shape of concavity 18 at the top of the cylinder is also not critical. It functions as a repository for any liquid that might spill over the top of the member. This liquid will be carried with the rotating member and will exert no drag on the rotational motion of the cylinder.

The dimensions of the cylindrical container and the rotatable cylindrical member are not particularly critical, but the accuracy of the instrument will be increased if the ratio of the inner diameter of the container to the diameter of the member is in the range of 1.15 to 1.65. In one particularly useful instrument, the rotatable cylindrical member has a diameter of 2 ⅝ inches and a length of 3 inches, with annular ridges at the ends of one-eighth inch thickness and between one-fourth and one-half inch depth. Such a cylinder will conveniently fit in a standard pint can, with a diameter of 3 ⅝ inches, to form a gap of about ⅜ of an inch between the container and the member. With this geometrical configuration, the average shear rate in the fluid in the gap will be 0.442 times the rotational speed of the cylindrical member. If a standard quart can with a diameter of 4 3/16 inches is used, the average shear rate will be 0.216 times the rotational speed of the cylindrical member. The shear rate can then be conveniently changed by varying either the rotational speed of the motor or by switching between conventional, and, in this case, disposable containers. Different size cylindrical members can also be used but a large rotating member can cause turbulence in the fluid and a small member reduces sensitivity and accuracy of the instrument.

Some means to provide relative rotational movement of the container and the cylindrical member must be provided. It doesn't matter whether the container or the member or both rotate so long as their relative motion is constant and variable. In the embodiment illustrated, the plate 14 to which the container 12 is attached is supported by shaft 20 of motor 21. This provides the capability of rotating the container. In normal circumstances, however, it is easier to rotate member 15. As illustrated, member 15 is, therefore, supported by shaft 16 which in turn is held by chuck 22 attached to the shaft 23 of motor 24. To allow for vertical movement of the member 15 into and out of the liquid, motor 24 is mounted on a bracket 25 which is clamped to a heavy duty ring stand 26 by clamp 27. In operation, the cylindrical member 15 is inserted into the liquid present in container 12 but alternatively the member can be in place within the container before the liquid is added to the container. The only criteria being that the member and container are concentric with one another, that the level of the liquid is level with or below the top of the member, and that liquid is excluded from concavity 17.

Any variable constant speed motor can be used to rotate either the member 15 or the container 12. For example, one motor, which has been found to be useful, is a dc motor generator such as the Motomatic Motor-Generator (Series E-650 or E-550) sold by Electro-Craft Corporation. This unit is capable of continuously variable rotational speeds of between 3 and 3000 rpm. However, the higher limit of speed used in a measurement should be chosen to avoid the onset of turbulence.

Some means 28, for monitoring the rotational speed of the motor and generating an electrical signal proportional to that speed is provided. Many conventional transducers will suffice. The rotational speed is displayed on display panel 30. An electrical feedback loop to maintain the rotational speed of the motor at the speed set by dial 31 is also provided. The electronics for such control is conventional and, in fact, a speed control system is supplied with the Electro-Craft Motor-Generator. Once the desired rotational speed is set by dial 31, the rotational speed monitor and the electrical feedback loop will maintain the speed at the desired level. Any convenient means can be used to measure the torque required to keep the member 15 rotating at a constant speed. One convenient way to measure this torque, however, is measure the current supplied to the motor-generator to maintain its rotational speed at the desired level. Such a system has to be calibrated for each member, but since the current supplied to the motor is proportional to the torque required to keep the member rotating at a constant speed, this method provides a simple, accurate and rapid way to determine the desired torque. Display panel 30 can be provided with a range changing switch 33. Alternatively, the current can be displayed on a chart recorder, a digital recorder, or it can be recorded in any other convenient manner.

Figure 2:
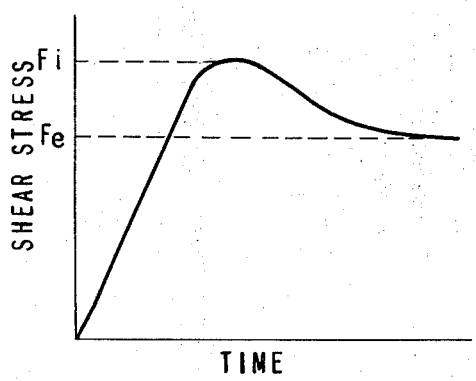
FIG. 2 is a plot of stress, or viscosity, versus time at a particular shear rate, from which the coefficient of thixotropy, defined as $(f_i-f_e)/f_e$, can be determined.

THe armature current required to keep the member rotating at a constant speed is proportional to the shear stress in the fluid, or in fact, its viscosity. For a thixotropic material, this shear stress at constant shear rate is not a constant with time. FIG. 2 shows the typical shape of a plot of the shear stress, at constant shear rate, versus time for a thixotropic material. The initial stress $f_i$ is the shear stress needed to initiate flow at the particular shear rate. As the flow starts, the rheological structure of the material breaks down and the shear stress decreases. The equilibrium stress $f_e$ is the stress needed to maintain flow where the breakdown reaches equilibrium. The difference between the initial and equilibrium stresses can thus be related to the strength of the gel structure. A coefficient of thixotropy $\theta$ can be defined as the ratio of the difference between the initial and equilibrium stresses to the equilibrium stress, i.e.:

$\theta = f_i - f_e/f_e$ For non-thixotropic materials, $\theta$ equals zero.

To study the recovery of thixotropic structure, a three step procedure is used. The process consists of structural breakdown, structural recovery and the measurement of $\theta$. The material is first sheared with a sufficiently high shear rate to insure structural breakdown. It is then left undisturbed for a definite length of time during which structural recovery takes place. When the recovery time is complete, $\theta$ is measured using a suitably low shear rate. The process can be repeated with different recovery times, and the plot of $\theta$ versus recovery time gives a fairly accurate representation of the thixotropic character of the material. The use of the initial high shear to cause structural breakdown reduces the different samples to a common basis, regardless of their history. The process of measuring thixotropic recovery can be programmed to operate automatically by installing a timer and other electrical and mechanical devices which together will turn on or turn off the member at predetermined intervals.

Alternately, it is possible to program the speed controller to steadily increase the speed of rotation. If this is done, then it is only the component of the armature current necessary to offset the drag exerted by the fluid that is measured. That portion used to increase the rotational speed of the member would have to be bucked out by some conventional means.

Figure 3:
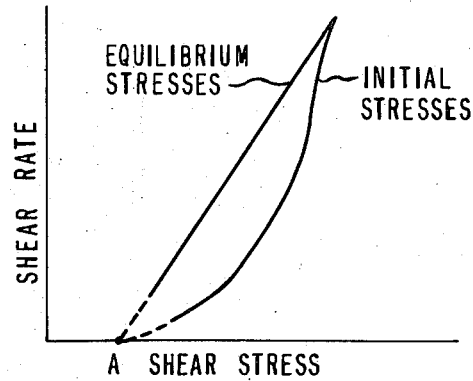
FIG. 3 is a plot of shear rate versus the initial and the equilibrium shear stresses showing the thixotropy loop from which yield stress can be determined.

If a thixotropic material is subjected to a number of different shear rates and the respective initial and equilibrium shear stress measured, a thixotropic loop can be obtained such as that shown in FIG. 3. Point A at which the curves representing the initial stresses and the equilibrium stresses intercept is called the yield stress. FIG. 3 is called the thixotropic loop, to be differentiated from the conventional hysteresis loop which does not describe thixotropy in any quantitative terms.

What is claimed is:

1. A device for measuring the rheological properties of a fluid, consisting essentially of:
   a. a cylindrical container for said fluid;
   b. a cylindrical member having a diameter slightly less than the inside dimeter of said container, said member having a concavity in at least one of its ends so that the side of said member forms a narrow annular ridge defining the concavity;
   c. means for supporting said member concentrically within said container, with the concavity facing downward, so that the top of said member is level with the top of said fluid;
   d. means for imparting relative rotational movement between said member and said container;
   e. means for continuously varying the speed at which said member and said container move relative to one another; and
   f. means for measuring that component of the torque required to keep said member and said container moving relative to one another at a constant speed.

2. The device of claim 1 wherein said member has a concavity in each of its ends.

3. The device of claim 2 wherein said member is stationary, and said means for imparting relative rotational movement is a means to rotate said container.

4. The device of claim 2 wherein said container is stationary, and said means for imparting relative rotational movement is a means to rotate said member.

5. The device of claim 2 wherein said container is stationary, and said means for imparting relative rotational movement is a means for imparting relative rotational movement at a constant speed which comprises: a shaft, attached to said member; a variable speed dc motor attached to said shaft; means for monitoring the rotational speed of said motor; and an electrical feedback loop for maintaining the rotational speed of said motor at a constant value.

6. The device of claim 5 wherein said means for measuring the torque required to keep said member rotating at a constant speed comprises means to measure the variable armature current supplied to the motor.

7. The device of claim 6 wherein the ratio of the radius of said container to the radius of said member is in the range of about 1.15 to about 1.65.

8. The device of claim 2 wherein said means for measuring the torque comprises a chart recorder.

9. The device of claim 2 wherein said means for measuring the torque comprises a digital recorder.

10. The device of claim 2 which further comprises means for automatically activating and deactivating said means for imparting relative rotational movement between said member and said container.

11. A method for measuring the viscosity of a fluid comprising the steps of:
   a. depositing said fluid into a cylindrical container;
   b. introducing into said fluid a rotatable cylindrical member, having a diameter slightly less than the inside diameter of the container and a concavity in its lower end, said member being introduced into said fluid in a manner such that air is trapped in said concavity;
   c. while maintaining the level of said fluid at or below the top of said member, subjecting said fluid to stress by rotating said member at a constant speed; and
   d. measuring the torque required to keep the member rotating at a constant speed.

12. A method for characterizing the thixotropy of a fluid comprising the steps of:
   a. depositing said fluid into a cylindrical container;
   b. introducing into said fluid a rotatable cylindrical member, having a diameter slightly less than the inside diameter of the container and a concavity in its lower end, in a manner such that air is trapped in said concavity;
   c. while maintaining the level of said fluid at or below the top of said member, subjecting said fluid to stress by rotating said member at a constant speed;

d. measuring the initial stress $f_i$ required to start the member rotating at a constant speed;

e. measuring the equilibrium stress, $f_e$, required to keep the member rotating at a constant speed; and f. taking the difference $(f_i-f_e)$ between the initial and the equilibrium stresses.

13. The method of claim 12 further comprising the step of forming the ratio $$f_i - f_e/f_e.$$

14. A method for measuring the yield stress of a fluid comprising the following steps:

a. depositing said fluid into a cylindrical container;

b. introducing into said fluid a rotatable cylindrical member, having a diameter slightly less than the inside diameter of the container and a concavity in its lower end, in a manner such that air is trapped in said concavity;

c. while maintaining the level of said fluid at or below the top of said member, subjecting said fluid to stress by rotating said member at a constant speed;

d. measuring the initial stress $f_i$ required to start the member rotating at a constant speed;

e. measuring the equilibrium stress, $f_e$, required to keep the member rotating at a constant speed;

f. repeating steps (c), (d) and (e) at a variety of constant speeds;

g. plotting both $f_i$ and $f_e$ as a function of rotational speed; and h. measuring the stress at the point where the extrapolation of both curves intercept the stress axis.

* * * * *